United States Patent [19]

Clavin

[11] 4,126,065
[45] Nov. 21, 1978

[54] PIPE END FINISHING APPARATUS

[75] Inventor: Edward A. Clavin, Houston, Tex.

[73] Assignee: Midcon Pipeline Equipment Co., Houston, Tex.

[21] Appl. No.: 787,555

[22] Filed: Apr. 14, 1977

[51] Int. Cl.² .............................................. B23B 5/16
[52] U.S. Cl. ...................................... 82/4 C; 82/82; 144/205; 266/55
[58] Field of Search .......................... 82/4 C, 2 E, 82; 144/205; 266/55

[56] References Cited

U.S. PATENT DOCUMENTS

| 3,458,958 | 8/1969 | Douglas | 144/205 X |
| 3,489,062 | 1/1970 | Greenberg et al. | 82/2 E |
| 3,733,939 | 5/1973 | Paysinger et al. | 82/4 C |
| 3,859,877 | 1/1975 | Sherer et al. | 82/82 |

Primary Examiner—Leonidas Vlachos
Attorney, Agent, or Firm—Carl B. Fox, Jr.

[57] ABSTRACT

Apparatus for finishing the ends of pipes, particularly for shaping the ends of pipes preparatory to welding the pipes together end-to-end, wherein the cutting tool or tools employed to finish the pipe end are urged against the pipe end hydraulically, and wherein the hydraulic fluid is pressured by a hydraulic pump which operates in response to rotation of the pipe end finishing apparatus. A variety of cutting tools may be employed, singly or in combination, for finishing the butt end of the pipe in flat, beveled, or stepped condition.

38 Claims, 13 Drawing Figures

PIPE END FINISHING APPARATUS

BACKGROUND OF THE INVENTION

Pipe end finishing machines of a variety of designs are known in the art. Exemplary apparatuses are disclosed in U.S. Pat. Nos. 3,744,356, 3,733,939, 3,813,968, 3,835,738, 1,823,959, 3,704,639, 1,841,550, 2,595,541, 2,861,608, 3,067,651, 3,103,140, 3,229,555, 3,540,329, and 3,699,828.

One problem which occurs during the operation of pipe end finishing apparatuses is that the cutting tool employed for finishing the end of the pipe is subject to vibration and chattering. The pipe end prior to finishing may be uneven or rough, and the cutting tool does not bear uniformly and evenly thereagainst, particularly during initiation of finishing. The spring-loaded and other mechanical assemblies heretofore employed for urging the cutting tool against the pipe are affected by changes of force between the cutting tool and the pipe end, and the heretofore mentioned vibration and chattering results. Another reason why chattering occurs is because the pipe ends are generally not entirely round in shape. The cutting tool support assembly cannot react quickly enough to maintain the tool at constant pressure or force against the pipe end when the irregularities of circularity of the pipe are encountered. There is a time lag for response of the tool supporting assembly to move the tool to a new radial position when such irregularities of circularity occur.

SUMMARY OF THE INVENTION

According to the invention, the end finishing cutting tools, which may comprise a single tool or multiple tools, are urged against the pipe and hydraulically so that a constant force of the cutting tool against the pipe end may be achieved. Each cutting tool is associated with a follower roller or wheel which is constantly engaged with the pipe interior, and also urged against the pipe interior hydraulically, so that both the roller and the cutting tool precisely follow the contour of the pipe end. Because of the fact that the hydraulic force urging the roller and tool against the pipe end is maintained constant, no chattering of the tool in contact with the pipe end occurs.

The end finishing apparatus is supported by a clamp device which is disposed within the pipe end. The clamp device is firmly clamped to be immovable with respect to the pipe end, and may act to circularize the pipe end. The portion of the pipe end finishing apparatus which carries the cutting tools is rotatable with respect to the pipe and with respect to the remainder of the pipe end finishing apparatus. A hydraulic pump carried by the rotatable portion of the pipe end finishing apparatus is driven in response to rotation of the rotatable apparatus portion to supply pressured hydraulic fluid for operation of the hydraulic cylinders which move and hold the follower wheel or roller and cutting tool against the pipe end. As stated before, there may be a single follower wheel and cutting tool or a plurality thereof in a particular apparatus. The aforesaid hydraulic system provides that the hydraulic cylinders which move the follower wheel and cutting tool against the pipe end are put into operation when the apparatus is operated to rotate the cutting tool supporting portion of the over-all apparatus. Therefore, when the apparatus is started in operation, the cutting tool or tools are immediately moved to cutting position, and when the apparatus is stopped, the cutting tool and follower wheels are immediately retracted. This enables automatic operation of these components.

A principal object of the invention is to provide a pipe end finishing apparatus wherein the cutting tool or tools employed to finish the pipe end are not subject to chatter and vibration. Another object of the invention is to provide such apparatus wherein the cutting tool or tools are held and advanced against the pipe end hydraulically. A further object of the invention is to provide such apparatus wherein the cutting tool or tools and auxiliary follower wheels are moved together into engagement with the pipe end by one or more hydraulic cylinders. Still another object of the invention is to provide such apparatus wherein the pressured hydraulic fluid for operation of the aforesaid hydraulic cylinders is provided by a hydraulic pump actuated by rotation of the portion of the end finishing apparatus carrying the cutting tool or tools. A further object of the invention is to provide such apparatus which is simple and dependable in operation, relatively low in cost, and which is of relatively light weight.

Other objects and advantages of the invention will appear from the following description of a preferred embodiment thereof, reference being made to the accompanying drawings.

DESCRIPTION OF THE PREFERRED EMBODIMENTS

Figure 1:
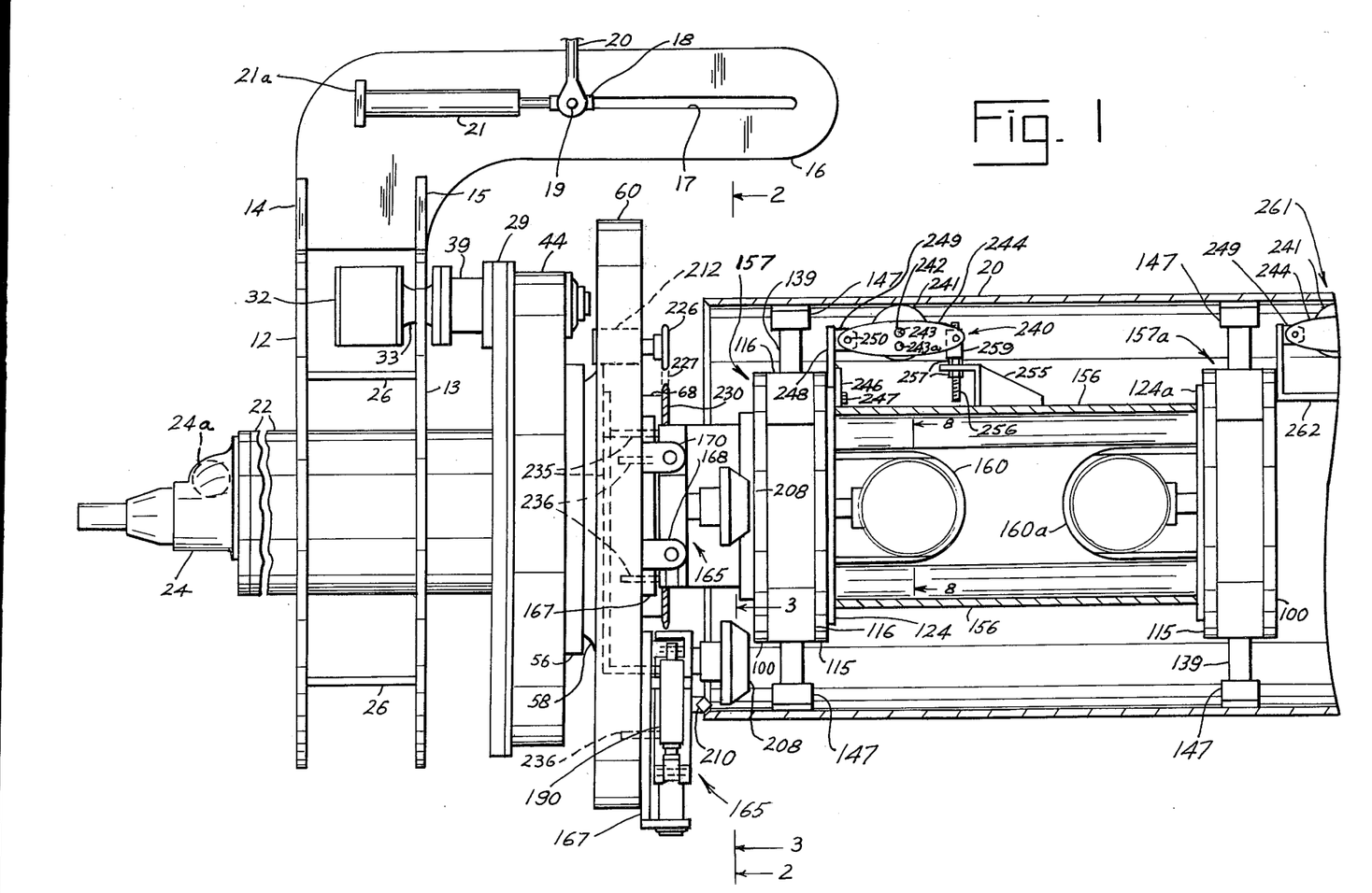
FIG. 1 is a side elevation, partly schematic, showing a preferred form of pipe end finishing apparatus according to the invention.
Figure 2:
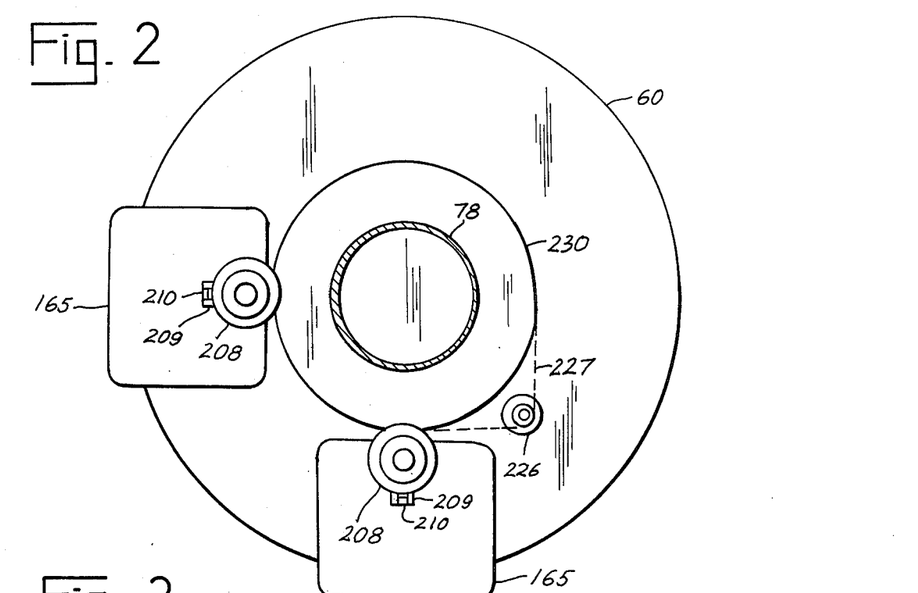
FIG. 2 is a vertical cross section taken at line 2—2 of FIG. 1, showing the locations of the follower wheels and cutting tools schematically.
Figure 3:
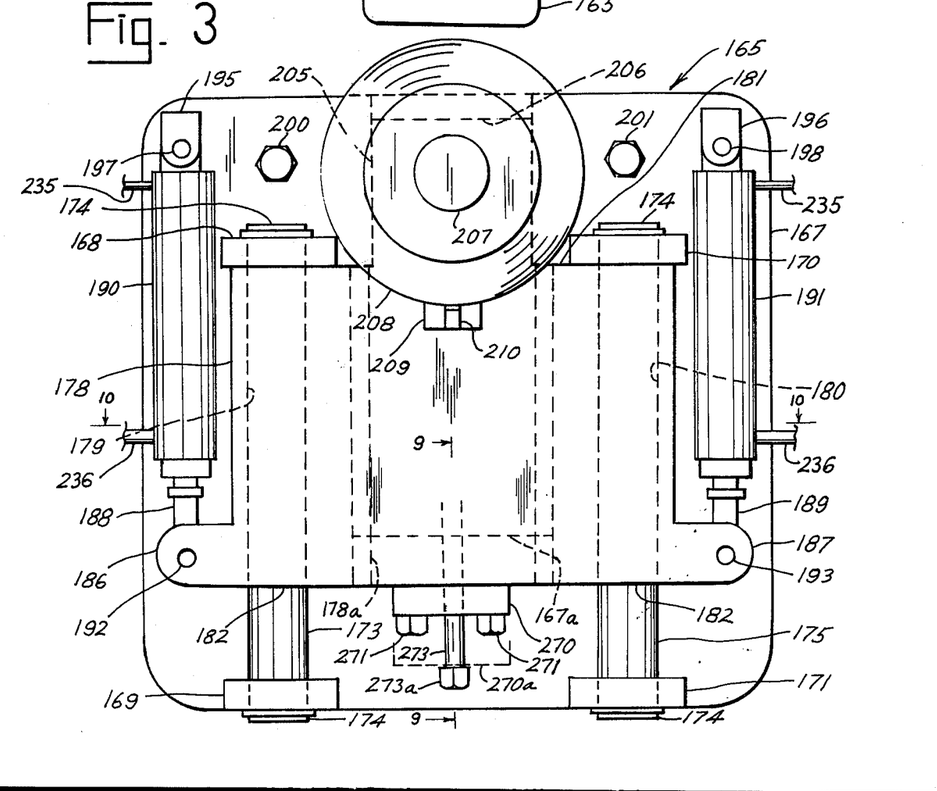
FIG. 3 is an enlarged elevation taken at line 3—3 of FIG. 1.

Referring now to the drawings in detail, and first to FIG. 1, elements 12, 13 are circular plates seen in edge view in FIG. 1. Plate 12 has an upwardly extending pair of brackets 14 at its upper side, one being shown, and plate 13 similarly has an upwardly extending pair of brackets 15, one being shown. The other elements 14, 15 are at the opposite or back side of lift connection element 16. Lift connection element 16 is welded between bracket elements 14, 15, the paired elements 14, 15 providing slots therebetween into which element 16 is fitted and welded in place. Element 16 extends horizontally at one side and has a slot 17 along its horizontal length in which a slide element 18 is disposed. A pin 19 through the slide element connects a connector 20 thereto. A hydraulic cylinder 21 supported at its base by plate 21a welded to element 16 has its shaft connected to slide element 18, and may be operated to move the slide element to a position in slot 17 to accomplish balance of the apparatus supported by a suitable lifting device such as a crane or hoist. The apparatus may be lifted and moved by the crane or hoist for insertion into the end of a pipe 20, or for movement to any other position or location. Plates 12, 13 have concentric openings therethrough through which is disposed a pipe 22. The device 24, driven by reversible hydraulic motor 24a, shown at the left hand end of pipe 22 in FIG. 1 is a hydraulically operated screw jack device for advancing and retracting pipe 22 axially along another pipe (not shown in FIG. 1) for movement of the cutting tool or tools toward and away from the end of a pipe which is to be finished. The device 24, for example, may be a device which is called a "Screw Jactuator".

A plurality of spacer bars 26 are spaced around pipe 22 between plates 12, 13, only two being shown in FIG. 1 but any suitable number being provided to support the plates properly spaced apart. Plates 12, 13 are welded to pipe 22 at 27, 28.

A drive motor support plate 29 has a concentric circular opening therethrough through which pipe 22 is fixed in place, plate 29 being welded to pipe 22 therearound at 30. An electric or other drive motor 32 is connected by bolts 35 to a sleeve 33 welded in place through an opening through plate 13. Element 37 of bull gear 38 extends through sleeve 33. The bull gear housing 39 is assembled to sleeve 33 by screws 41. Bull gear 38, turned by motor 32, rotates pinion gear 43 within gear housing 44. These latter described elements are shown in more detail in FIG. 7 of the drawings. At its other side, pinion gear 43 is journaled in bearing 46 secured to housing 44. Ring gear 50, engaged with pinion gear 43, is rotatively disposed about pipe 22. Bearing sleeve 52 surrounds pipe 22, beneath element 60 having flange 51 extending beneath ring gear 50. A bearing ring 54 is disposed between plate 29 and ring gear 50. A bearing 55 is provided between flange 56 of gear housing 44 and flange 58 of rotating ring support element 60. Sleeve 52 forms a bearing between element 60 and the outer surface of pipe 22. Ring 60 is connected to ring gear 50 by a plurality of circularly spaced screws 60 extending through cylindrical screw openings through flange 58 and screwed into tapped openings in the ring gear. The heads 63 of screws 61 are disposed in recesses 64. A bearing ring 67 is disposed between ring 68 and ring element 60, ring element 68 being screwed to the end of pipe 22 by a plurality of screws 70.

Figure 7:
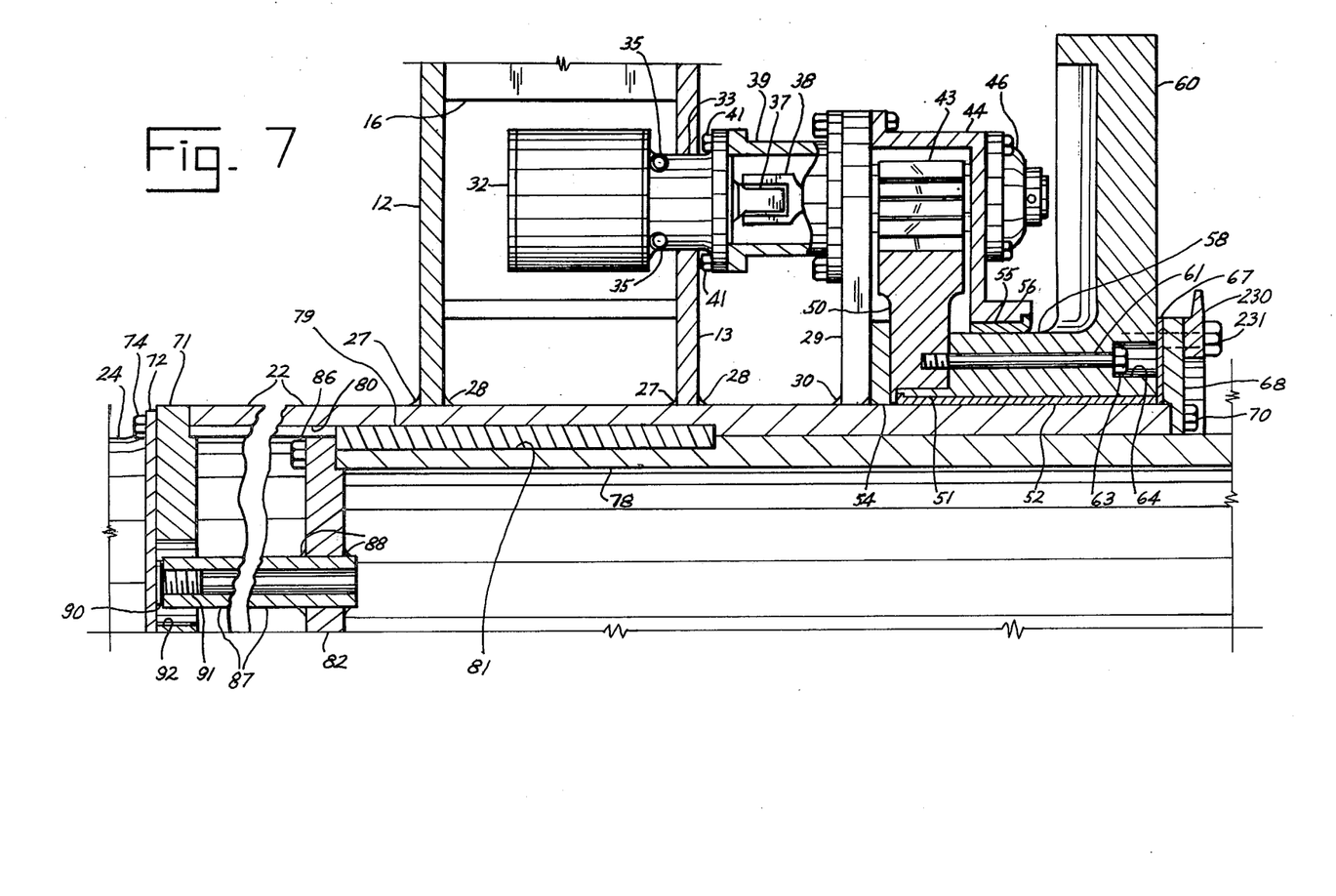
FIG. 7 is a vertical cross section showing the apparatus employed for driving the rotative part of the pipe end finishing apparatus in rotation.

Still referring to FIGS. 1 and 7, a circular plate 71 is connected along with flange 72 of device 24 to the end of the pipe 22 by a plurality of circularly spaced screws 74, only one being shown. A pipe 78 is telescopedly received in the right hand end of pipe 22, and secured against rotation by key 79 disposed in longitudinal key slot 80 of pipe 22 and in longitudinal key slot 81 of pipe 78. Pipe 78 can move longitudinally a limited amount within pipe 22, but may not be rotated therewithin. A circular plate 82 connected to the end of pipe 78 by a plurality of screws 86 (only one being shown) has a concentric circular opening through which is disposed a pipe 87 welded in place at 88. The left hand end of pipe 87 is internally threaded and is connected to shaft 90 of device 24 at threaded stud 91. Plate 71 has a central opening 92 therethrough to permit passage of shaft 90 and pipe 87. When the device 24 is operated in one direction, pipe 22 is moved toward the right (FIG. 7) with regard to pipe 78. Opposite operation of device 24 moves pipe 22 toward the left with respect to pipe 78. All of the elements supported by pipe 22, including ring element 60 are moved with pipe 22 when device 24 is operated in either direction.

Figure 4:
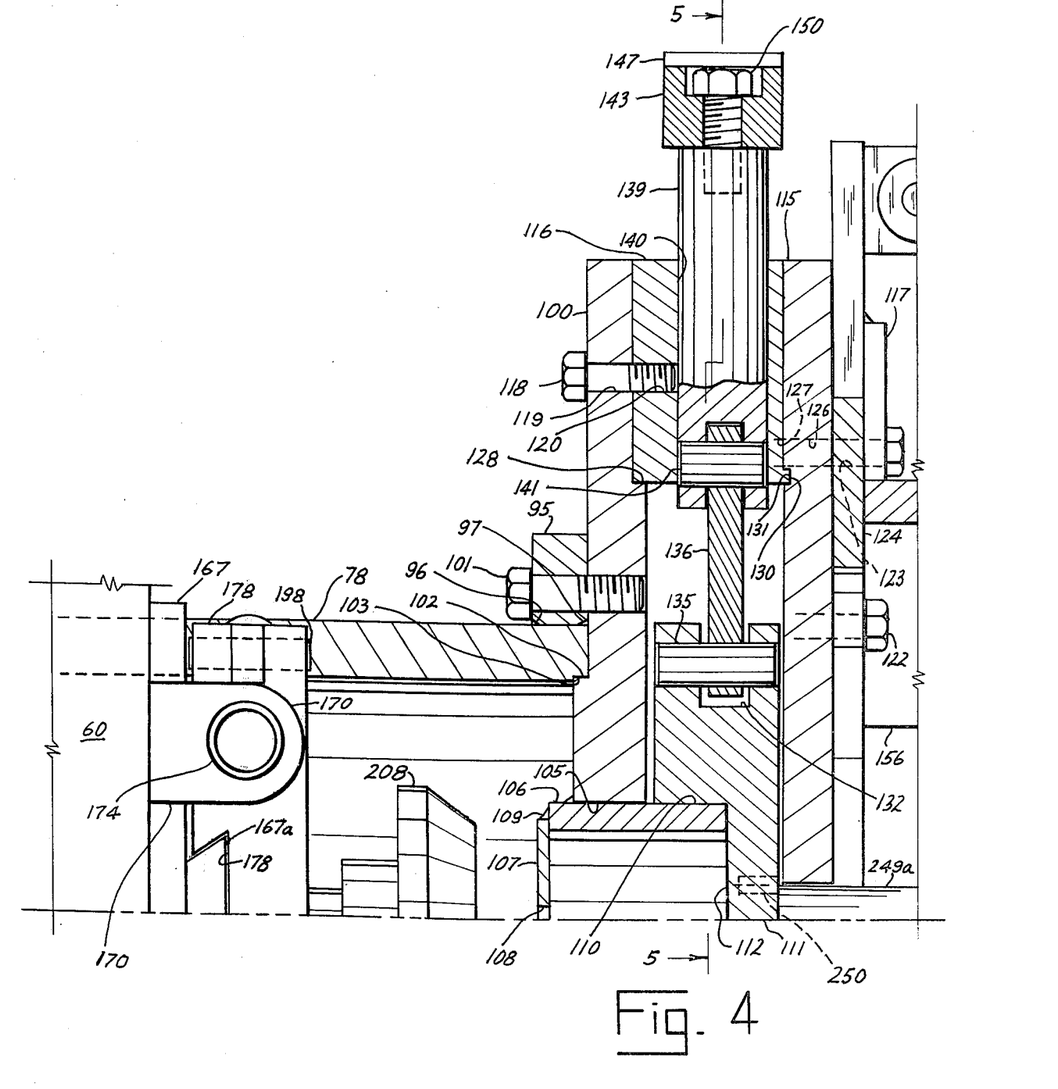
FIG. 4 is an enlarged vertical cross section of a part of the clamp device.

Still referring to FIG. 1, and also to FIG. 4, pipe 78 has at its right hand end, as shown in FIGS. 1 and 4, a flange 95 welded to the end of pipe 78 at 96, 97. Flange 95 is connected to a circular plate 100 by a plurality of equally circularly spaced screws 101. The screws 101 are inserted through screw holes through flange 95 and screwed into tapped openings of plate 100. Plate 100 has shoulder 102 which is fitted into recess 103 of pipe 78. Plate 100 has a concentric circular opening 105 therethrough within which is received and welded in place a short length of pipe 106. A circular plate 107 having central opening 108 is welded to the left hand end of pipe 106 around its periphery at 109. The right hand end portion 110 of pipe 106 serves as a bearing for rotatable disc 111 which has circular recess 112 concentrally at its left hand side into which the end of pipe 106 is received.

Figure 5:
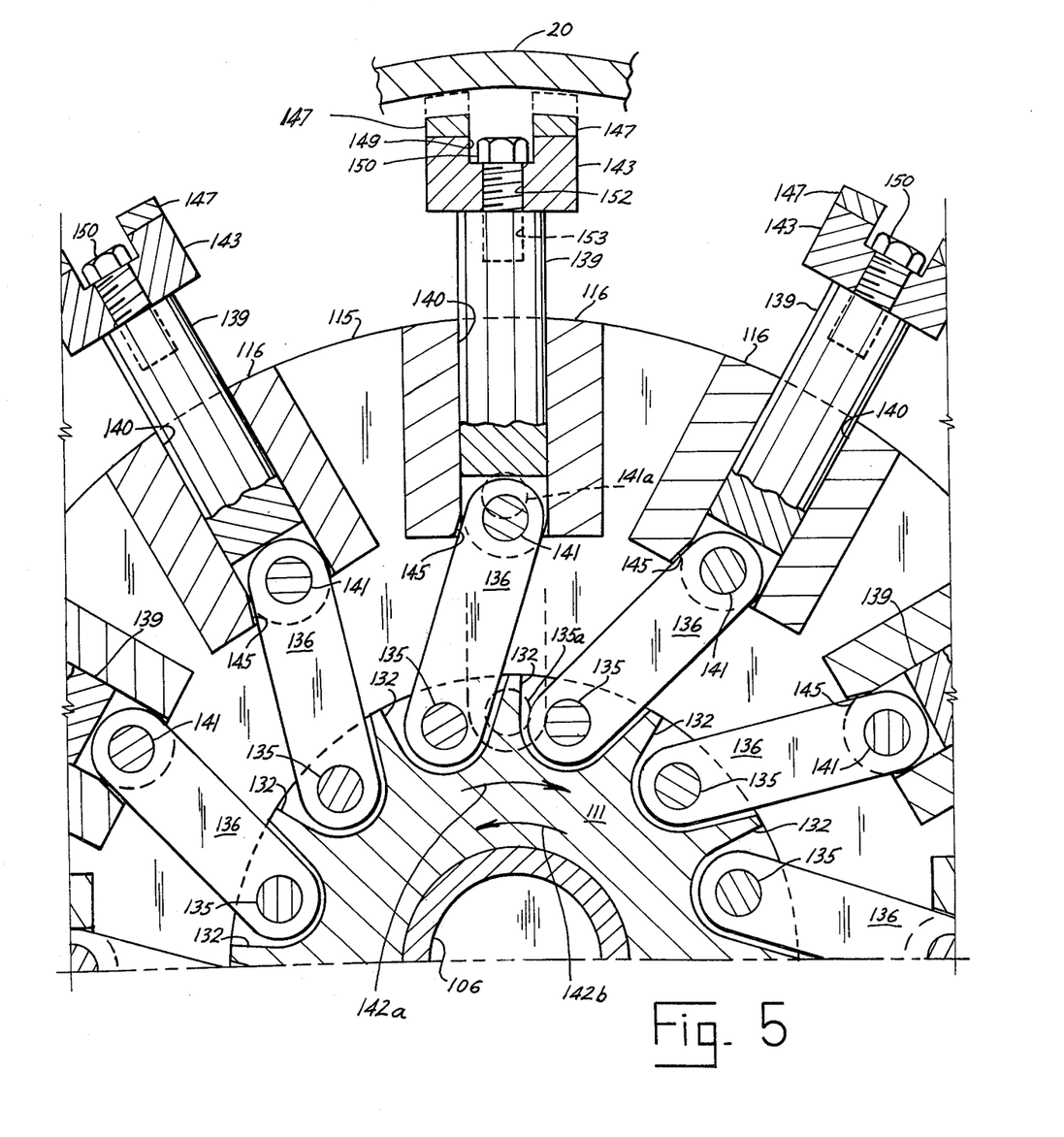
FIG. 5 is a vertical cross section taken at line 5—5 of FIG. 4.

Referring now also to FIG. 5 of the drawings, a second circular plate 115 of the same diameter as plate 100 is secured to plate 100 by a plurality of equally circularly spaced blocks 116. Screws 118 inserted through screw holes 119 through plate 100 and into tapped openings 120 of blocks 116 secure plate 100 to blocks 116. A plurality of circularly disposed screws 122 are disposed through screw holes 123 through a ring 124 and plate 117 and through screw holes 126 through plate 115 to be screwed into tapped openings 127 of the blocks 116. The blocks 116 are located against shoulder 128 of plate 100 and have protruding flanges 130 received in fitted slots 131 in the inner face of plate 115. In FIG. 4, only one block 116 is shown, a plurality of blocks 116 about a portion of the periphery of plate 115 being shown in FIG. 5.

Disc 111 has a plurality of shaped recesses 132 equally spaced around its outer periphery. Pins 135 connect the lower ends of toggles 136 to disc 111. Pins 135 are disposed through circular openings through disc 111 at opposite sides of recesses 132, and through a fitted circular opening through each toggle 136. The upper end of each toggle is similarly connected to the lower end of a cylindrical slide element 139 slidably received through a radial bore 140 of each block 116. Pins 141 are disposed through openings through the slide element and toggle 136 as shown. Referring to FIG. 5, when disc 111 is rotated in a right hand direction (arrow 142a) to bring each pin 135 into line with the axis of the slide element 139, the slide element is moved outwardly. As shown for the central toggle 136 in FIG. 5, the pin 135 is moved to a position 135a in line with the associated slide element 139, the pin 141 being moved radially outwardly to a position 141a, the slide element 139 and shoe 143 at its outer end being moved radially outwardly correspondingly. Rotation of disc 111 in the direction of arrow 142b retracts shoes 143. Clearance for the toggle movements are provided by the recesses 145 at the inner ends of the bores of blocks 116, the recesses 132 being shaped corresponding to the toggle movements. The shoes 143 have facing elements 147 adapted for contact with the inner surface of a pipe 20. The shoes 143 are connected to the outer ends of slide elements 139 by screws 150 the heads of which are disposed in recesses 149, the screws being disposed through screw holes 152 of the shoes and screwed into tapped openings 153 concentrically in the outer ends of slide elements 139.

Referring to FIGS. 1 and 4, a plurality of bars 156 of arcuate cross section, circularly spaced around ring 124, are welded at their left hand ends to ring 124 and at their right hand ends to the left face of a similar ring 124a. The left hand clamp unit 157, just described, is duplicated in mirror image form by clamp unit 157a disposed at the right hand ends of the bars 156. The discs 111 of units 157, 157a are rotated by drive units 160, 160a, which are indicated in outline in FIG. 1. The drive units 160, 160a may be any type of drive unit suitable for rotating discs 111 with suitable force in both directions of rotation, to cause extension and retraction of the shoes 143 so that the clamp units may be set in the pipe and released. Preferably, drive units 160, 160a will be rotary actuators of the type of the DYNA-PACT rotary actuators made by Ohio Oscillator Co., Inc. For example, the drive units 160, 160a may be DYNA-PACT Model DB-62 rotary actuators.

Figure 8:
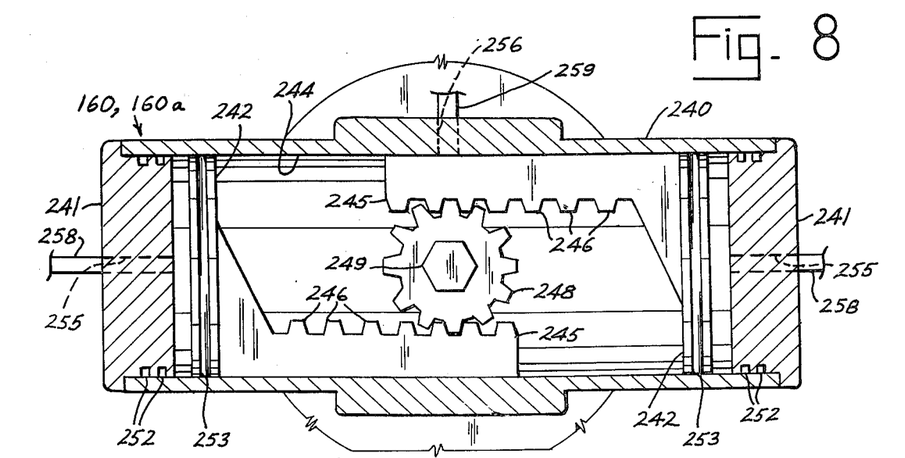
FIG. 8 is an axial cross section taken at line 8—8 of FIG. 1.
Figure 9:
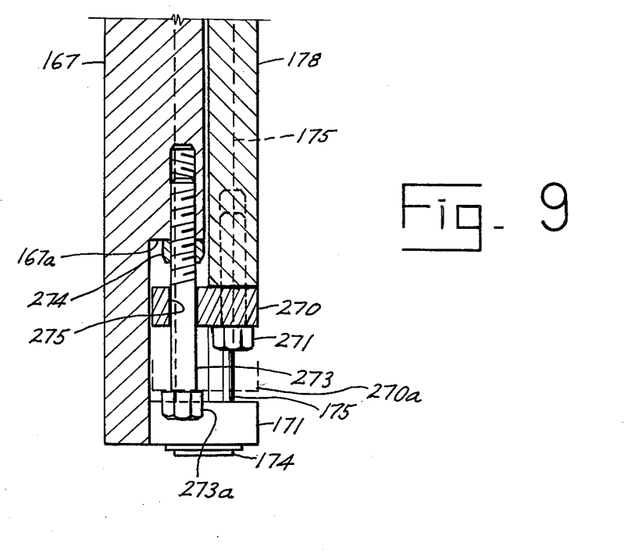
FIG. 9 is a partial cross section taken at line 9—9 of FIG. 3.
Figure 10:
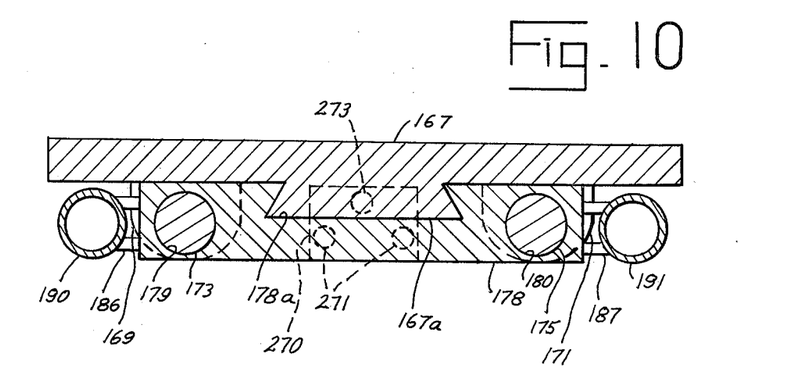
FIG. 10 is a cross section taken at line 10—10 of FIG. 3.

Referring to FIG. 8, each drive unit or rotary actuator 160, 160a has a cylindrical body 240 closed at its opposite ends by circular caps or covers 241 secured to body 240 in a fluid tight manner so that body 240 can withstand the internal fluid pressure to be imposed therewithin. A pair of pistons 242 are disposed in opposite dispositions within the interior cylindrical space 244 within body 240. Each piston 242 has integrally formed therewith a gear rack 245 having plural gear teeth 246 therealong. Gear teeth 246 of the two racks engage opposite sides of pinion gear 248 carried on hexagonal shaft 249. Shaft 249 is cylindrical at its other end portion 249a (FIG. 4), and is keyed to disc 111 by a key 250, so that disc 111 is rotated by operation of drive units 160, 160a, in one direction to extend shoes 143 outwardly and in the other direction to retract shoes 143 inwardly.

Seals 252 are provided around caps 241 to prevent fluid leakage therepast, and pistons 242 have seal rings 253 therearound for the same purpose. Ports 255, 256 are provided for flow of hydraulic fluid into and out of the cylinder for operation of the drive units. The fluid is conveyed by conduits 258, 259 to and from a suitable source of hydraulic fluid (not shown). The drive units may have only one instead of two of the piston-rack elements 242, 245 if the drive output thereof is sufficient for the loading required.

Referring now to FIGS. 1-3 and 9-10 of the drawings, one or a plurality of the tool carrying units 165 are connected to plate or disc 60 for rotation therewith. Each tool carrying unit 165 has a base plate 167 to which are affixed four brackets 168-171. A shaft 173 is disposed through suitable circular fitted openings through brackets 168, 169 and held in place by end fittings 174. An identical cylindrical shaft 175 is identically connected between brackets 170, 171.

A movable slide member 178 has spaced parallel cylindrical shaft openings 179, 180 adjacent its opposite sides. The shafts 173, 175 are slidably received through these openings. Element 178 is slidably movable between an upper position in which its upper edge 181 is in contact with brackets 168, 170 and a lower position in which its lower edge 182 is in contact with brackets 169, 171. Oppositely disposed outwardly protruding yokes 186, 187 are provided and the lower shafts 188, 189 of hydraulic cylinders 190, 191, respectively, are connected thereto by cross pins 192, 193, respectively. The upper ends of cylinders 190, 191 are connected to brackets 195, 196, respectively, by pins 197, 198, the brackets 195, 196 being secured to plate 167. Each plate 167 is secured to plate 60 by screws 200, 201 passed through holes through plate 167 and screwed into tapped openings in the face of circular plate 60.

Provision is made for adjustably limiting the outward travel of elements 178 and wheels 208 and cutters 210 carried thereby. A plate 270 is secured to the outer edge of each element 178 by screws 271 screwed into tapped openings in element 178. Plate 270 overhangs the outer end of projection formation 167a, and a screw 273 is screwed into a tapped opening in the outer end of formation 167a and secured by a lock nut 274. The screw 273 passes slidably through a hole 275 through plate 270. The outward extent of screw 273 is adjustable by adjustment of the length of the screw screwed into the tapped opening in the outer end of formation 167a. Element 178 can move outwardly only to the extent permitted by plate 270 coming into engagement with head 273a of screw 273 at position 270a.

Element 178 has an upwardly projecting portion 205 which is inturned at its upper end 206. Element 178 has an angled-sided recess 178a vertically disposed at its side toward plate 167, and plate 167 has an angled-sided projection 167a slidably received therein. The shaft 207 of a follower wheel 208 is supported from portion 205 of element 178. A tool support 209 of any suitable form (shown in simplified form in the drawings) is affixed to the face of element 178 adjacent the outer edge of wheel 208 and carries a cutting tool 210 for doing work on the pipe end to finish it. Follower wheel 208 is beveled at its front portion 208a for guidance of the wheel into the pipe end.

Figure 6:
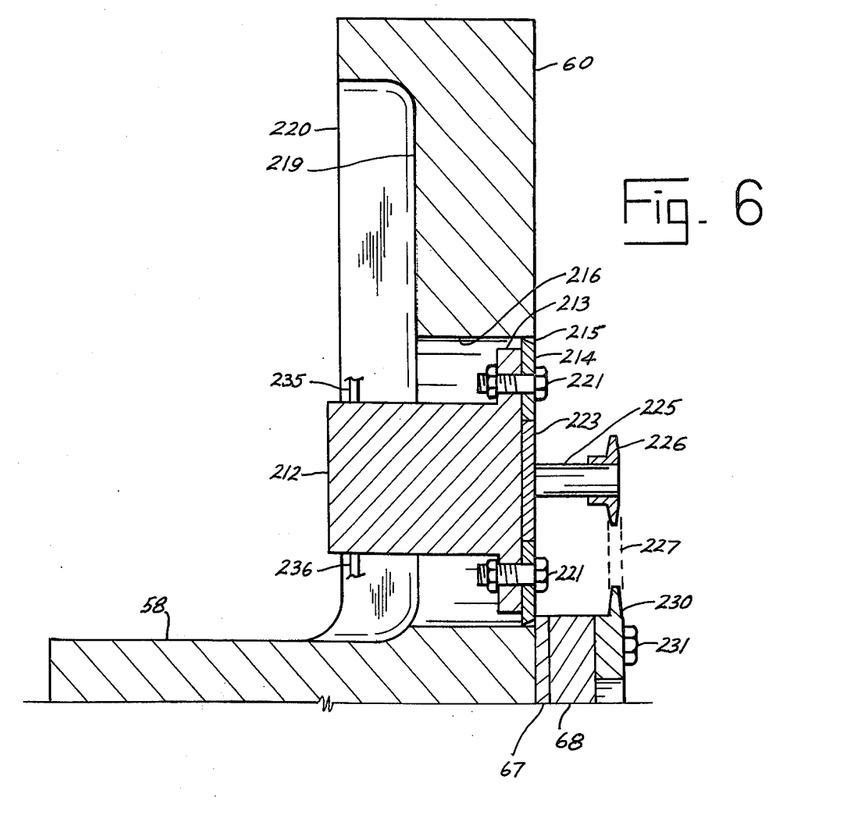
FIG. 6 is vertical cross section showing the hydraulic pump carried by the rotative portion of the pipe end finishing apparatus.

In FIG. 6, there is shown a hydraulic pump 212 having flange 213 bolted to ring plate 214 welded at periphery 215 into circular opening 216 through element 60. Element 60 is hollowed at 219 to lighten its weight and has radial ribs 220 equally circularly spaced therearound. Bolts 221 are received through suitable holes through ring 214 and flange 213 for the purpose of securing the hydraulic pump 212 to ring 214. Pump 212 has a concentric portion 223 at its front side which fits within the central opening of ring 214 as shown in FIG. 6.

Shaft 225 of pump 212 carries a chain sprocket 226, or the like, around which is disposed a chain 227 or other loop-formed driving belt, chain 227 being also passed around ring sprocket 230 secured by a plurality of circularly spaced screws 231 to ring 68. Ring 68 is non-rotative, so that ring sprocket 230 is non-rotative. Sprocket 226 rotates with element 60. Therefore, whenever element 60 is driven in rotation by operation of motor 32, hydraulic pump 212 and its sprocket 226 are rotated circularly around sprocket 230, this causing rotation of sprocket 226 and shaft 225 to operate hydraulic pump 212. Hydraulic fluid is carried through conduit or tube 235 which branches and leads to all of the cylinders 190, 191 of the pipe end finishing tool units 165. Conduit 236 leads from a suitable hydraulic fluid reservoir, not shown. Excess hydraulic fluid pressure is vented through pressure relief fittings 236. When rotation of element 60 is stopped, pump 212 stops operating and the reduced pressure causes the cylinders 190, 191 to move in the reverse direction to retract wheels 208 and cutting tools 210. As has been explained, hydraulic pump 212 does not operate except when element 60 is rotated by operation of motor 32. To further explain the operation of the cylinders 190, 191, each cylinder 190, 191 has a fluid actuated piston (not shown) therein connected to the shafts 188, 199. When pump 212 is operating, pressured hydraulic fluid is delivered to one side of each piston through conduits 235. Hydraulic fluid pressure is retained at the other side of each piston by the pressure relief fittings 236a. When operation of pump 212 is stopped, the pressure in conduits 235 drops, and the cylinder pressures at the sides of the pistons to which conduits 235 are connected drops. When this occurs, the pressure at the other sides of the pistons causes the cylinders 190, 191 to retract the slide members 178 and the wheels 208 and cutters 210 carried thereby inwardly away from the pipe wall. The cylinders 190, 191 move tool carrying elements 185 outwardly under hydraulic force to bring the follower wheels 208 into engagement with the interior side of the pipe wall, and to bring the finishing tools 210 of each unit 165 into cutting engagement with the pipe end.

Since the hydraulic force of the cutting tools against the pipe is constant regardless of pipe irregularities, no vibration or chattering occurs and the cutting tool will move quickly to follow the pipe irregularities as cutting of the pipe end is performed so that end finishing will proceed smoothly until complete. To further explain, when pump 212 is operating, hydraulic fluid at constant pressure is continuously supplied to one side of each piston of the cylinders 190, 191 in a direction to expand the cylinders and to extend the slide elements 178 to move wheels 208 and cutters 210 outwardly against the pipe wall. Since wheels 208 are biased against the pipe wall by the constant hydraulic fluid pressures in cylinders 190, 191, the wheels will constantly and accurately follow the pipe wall contour even though the pipe wall radius may vary around the circumference of the pipe. The cylinders 190, 191 constantly press the wheels 208 against the pipe wall under constant hydraulic fluid pressures within the cylinders so that the cutters 210 are maintained in a uniform relation to the pipe wall at all times. The wheels and cutters do not vibrate or chatter with regard to the pipe wall because of the constant pressures of the cylinders urging the cutters against the end of the pipe.

A variety of pipe end finishing tools may be employed, for finishing the flat end of the pipe, for forming bevels, for forming grooves, or for any other pipe end shape desired. While two units 165 are shown in the drawings, any suitable number may be provided.

The clamp portion of the apparatus (see FIG. 1) is provided with wheels to enable it to be rolled into and out of the end of a pipe when the clamp units 157, 157a are retracted. Adjacent clamp unit 157, three wheel assemblies 240 are provided, spaced 120° apart around the periphery of the apparatus, only one such assembly being shown in the drawing and the other two assemblies being identical. Wheel 241 is rotatively carried on a shaft or axle 242 fixed through suitable holes 243 of a pair of pivotal support plates 244, the second such plate being behind the one shown in the drawing. Second shaft holes 243a are provided inwardly of holes 243 so that the wheels may be positioned inwardly to adapt the wheels to pipes of a smaller diameter. In other words, the apparatus has adjustment capacity so that it may be used for finishing the ends of two sizes of pipe, by simply moving the wheel shafts from the outer holes 243 to the inner holes 243a, or vice versa.

Plate 246 is bolted to plate 115 at 147 and plate 248 welded thereto extends outward of plate 115. Bracket 249 carried by plate 248 has one end of each plate 244 pivotally connected thereto as shown by pin 250.

Bracket 255 welded to plate 156 has screw 256 affixed thereto by oppositely disposed nuts 257. An internally threaded fitting 259 has the right hand end of each plate 244 pivotally connected thereto by oppositely disposed pins thereof. The three wheels 241 may each be adjusted inwardly and outwardly by loosening nuts 257 and retightening them at a different position along screw 256.

Three similar wheel assemblies 261, circularly spaced 120° apart, are affixed to plate 100 of clamp unit 157a, only one being shown. The assemblies 261 are supported by three L-shaped brackets 262.

In operation of the apparatus, the apparatus is lifted by a suitable lifting device such as a crane or hoist engaged with lift connection element 20, balanced by operation of cylinder 21, and the clamp units 157 and 157a are inserted into a pipe 20 the end of which is to be finished by beveling or the like. The pipe is positioned axially with respect to the apparatus such that the cutting tool or tools 210 are disposed inwardly adjacent the end of the pipe. The clamp units 157, 157a are expanded to tightly engage pads 147 of shoes 143 with the pipe interior, by operation of drive units 160, 160a to rotate discs 111 to move the shoes to expanded positions. The cutting tools may be advanced or withdrawn axially of the pipe by device 24 to bring the cutting tool or tools into proper position inward of the position for doing finishing work on the pipe end. Next, motor 32 is operated to rotate element 60, this causing operation of hydraulic pump 212 to expand cylinders 190, 191 of the cutting tool assemblies, to bring follower wheels 208 into engagement with the pipe interior and to bring cutting tools 210 into cutting engagement with the pipe end. As finishing of the pipe end continues, device 24 advance the cutting tools at a uniform rate toward the right (FIG. 1) by sliding pipe 22 toward the right (FIG. 7) on pipe 78. After the finishing of the pipe end has been completed, operation of motor 32 is discontinued, and the cutting tools 210 are withdrawn from the pipe end by cylinders 190, 191. The clamp units may then be released by reverse operation of drives 160, 160a, and the apparatus removed from the pipe. Because the cylinders 190, 191 apply the cutting tools to the pipe end with uniform force during the cutting operation, and with no alterations in cutting tool force against the pipe caused by pipe irregularities, the complete cutting operation is accomplished without vibration and chattering of the cutting tools against the pipe, and without pitting and scarring of the pipe end by the tools.

Figure 11:
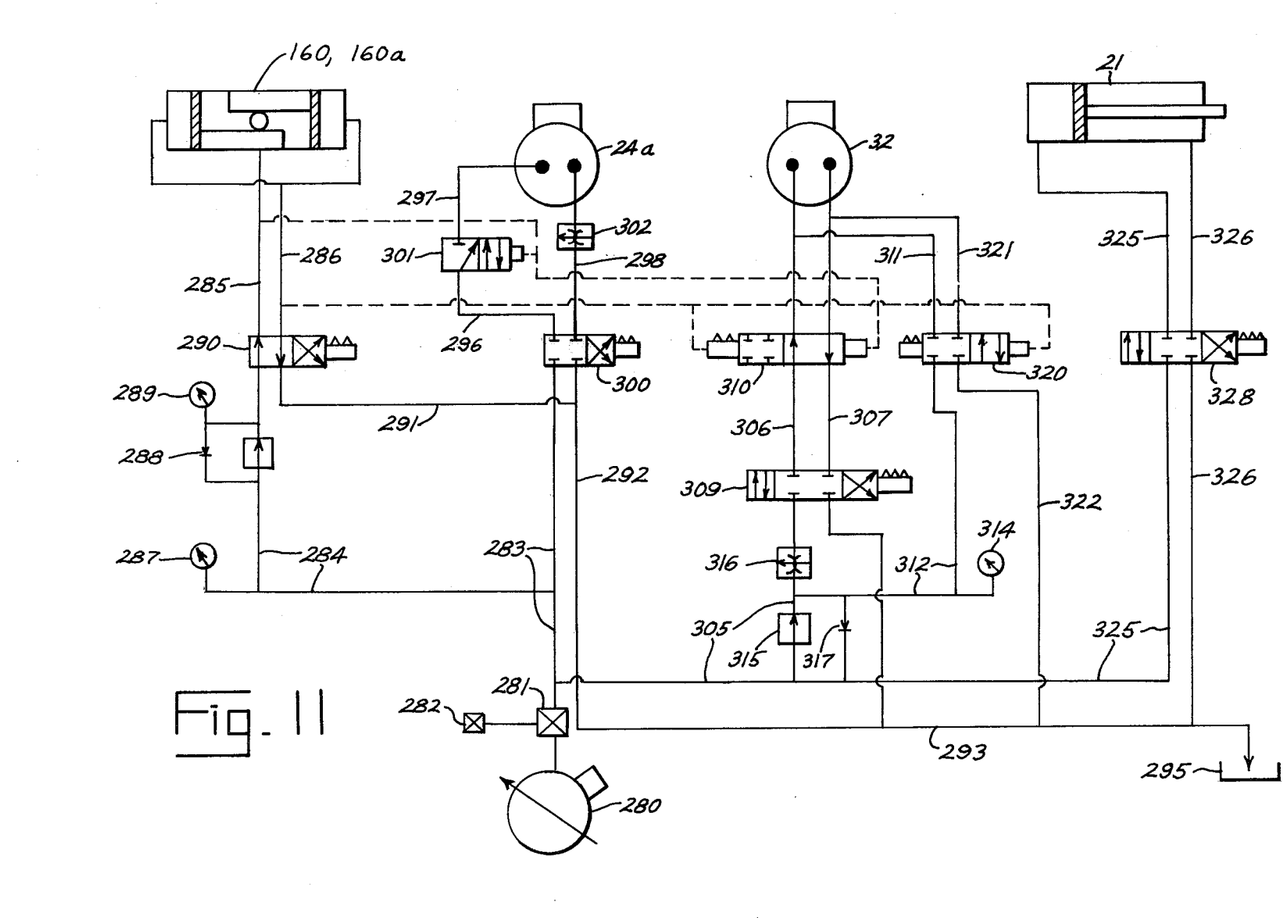
FIG. 11 is a schematic diagram of the control system.
Figure 12:
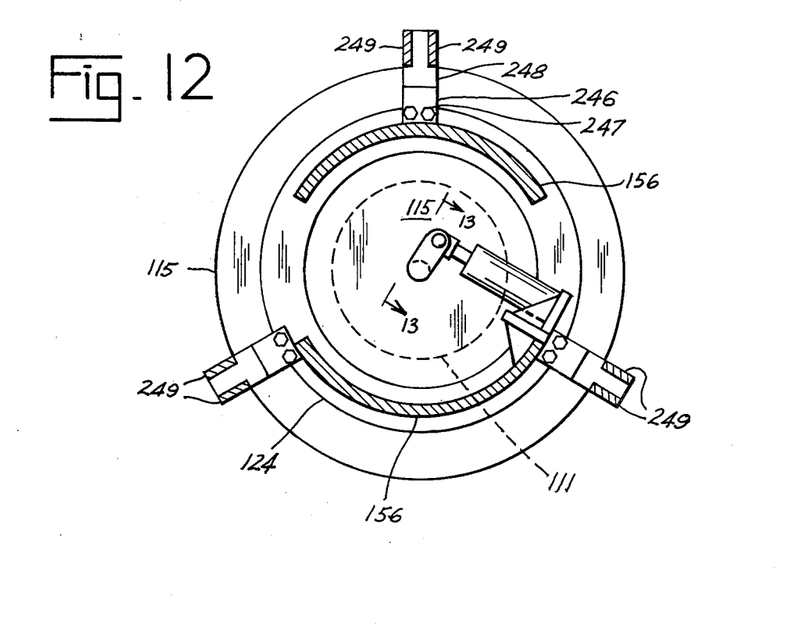
FIG. 12 is a vertical cross section taken to the right of ring 124, FIG. 1, looking toward ring 124.
Figure 13:
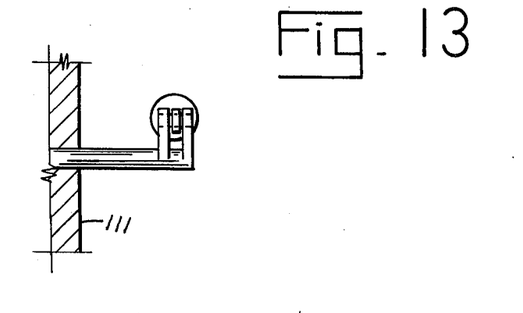
FIG 13 is a partial cross section taken at line 13—13 of FIG. 12.

The hydraulic control system for operating the apparatus is shown schematically in FIG. 11 of the drawings, the hydraulic units involved being hydraulic motors 24a and 32, clamp drives 160, 160a, and hydraulic cylinder 21.

Hydraulic fluid pump 280, the outflow of which is controlled by valve 281 controlled to close by controller 282, supplies pressured hydraulic fluid from a suitable source (not shown) via conduits 283, 284 and 285, 286 to clamp drives 160, 160a. Pressure gage 287 indicates fluid pressure in conduit 284. By-pass check valve 288 vents fluid to conduit 284 when pump 280 is shut off, the vented pressure being indicated by pressure gage 289. Control valve 290 connects conduit 284 to conduit 285 or to conduit 286 depending on the direction of operation of drive units 160, 160a. The fluid exhausted from drives 160, 160a passes through the other conduit 286 or 285, and through conduits 291-293 to receiver 295.

Pressured hydraulic fluid from pump 280 is delivered through conduit 283, and conduits 296, 297 or conduit 298, to hydraulic motor 24a. Return fluid travels through conduit 298 or conduits 297, 296, and through conduits 292 and 293 to receiver 295. Control valve 300 directs the fluid from conduit 283 to conduits 296, 297 or to conduit 298, depending on the direction of operation of motor 24a to advance or retract the cutting heads. Automatic shut off valve 301 shuts off flow of hydraulic fluid to motor 24a to advance the cutting heads when low pressure exists in conduit 285. Pressure regulator 302 is provided in conduit 298.

Pressured hydraulic fluid from pump 280 is delivered through conduits 283, 305, and conduit 306 or conduit 307, to hydraulic motor 32. Control valve 309, having shut off, fluid flow, and reverse fluid flow positions, is provided in conduits 306, 307. Automatic shut off valve 310 provided in conduits 306, 307 shuts off fluid flow to motor 32 when the pressure in conduit 286 exceeds the pressure in conduit 285. By pass conduit 311, 312 having pressure gage 314 extends from conduit 306 adjacent motor 32 to conduit 305, between a check valve 315 and pressure regulator 316 in conduit 305, as shown. By pass check valve 317 is provided across check valve 315. Automatic shut off valve 320, which operates upon reduction of pressure in conduits 286, is provided in conduit 311, 312 and conduit 321, 322, conduit 321, 322 leading from motor 32 to conduit 293.

Pressured hydraulic fluid from pump 280 is delivered through conduits 283, 305 and 325 to one side of the piston of hydraulic cylinder 21. Conduit 326 connects the opposite side of the piston of hydraulic cylinder 21 to conduit 293 leading to receiver 295. Control valve 328 having shut off, fluid flow, and reverse fluid flow positions is provided in conduits 325, 326, as shown.

Setting and release of clamp units 160, 160a is controlled by manual operation of valve 290. When the clamp units are not set, hydraulic motors 24a and 32 will not operate, and hydraulic motors 24a and 32 are shut off if operating when clamp units 160, 160a are released. Operation of motor 24a may be started or stopped by manual operation of valve 300. Operation of motor 32 may be started or stopped by manual operation of valves 310, 320. Operation of hydraulic cylinder 21, to balance the apparatus at connector 20 is performed by manual operation of valve 328, independently of the other systems. When element 60 is stopped from rotating, the cutter tools 210 are retracted inwardly away from the pipe end because of termination of operation of pump 212 to release hydraulic cylinders 190, 191.

Since the tool holding and advancing units of the apparatus are light in weight, and since the clamp units employed with the apparatus are also lighter in weight than convention clamp devices because of the relative simplicity of their design, the overall apparatus is relatively light in weight as compared with other apparatuses, and is therefore more economical and more efficient and simple to operate than conventional end finishing apparatuses.

While a preferred embodiment of the apparatus has been described and shown in the drawings, many modifications thereof may be made by a person skilled in the art without departing from the spirit of the invention, and it is intended to protect by Letters Patent all forms of the invention falling within the scope of the following claims.

I claim:

1. Apparatus for use in finishing the ends of pipes, comprising first body means, means for supporting said first body means adjacent an end of a cylindrical pipe, second body means movable along said first body means axially of said pipe, means for moving said second body means along said first body means, support means carried by said second body means adapted to rotate coaxially of said pipe, means for rotating said support means about second body means and about said pipe, cutting tool means carried by said support means and movable away from and toward the axis of said pipe by cylinder means supported by said support means, and means responsive to rotation of said support means for supplying fluid to said cylinder means for moving said cutting tool means into and away from cutting engagement with the end of said pipe.

2. The combination of claim 1, said means for supporting said first body means comprising means carried by said first body means adapted to engage the interior of said pipe.

3. The combination of claim 2, said means adapted to engage the interior of said pipe comprising internal pipe clamp means comprising a plurality of circularly spaced longitudinally movable shaft means, rotative means supported concentrically inward of said shaft means, plural toggle means each pivotally connected at its outer end to one of said shaft means and each pivotally connected at its inner end to said rotative means, said toggle means each being movable by rotation of said rotative means between a first position with the shaft means connected thereto disposed relatively outward and a second position angular to said first position with the shaft means connected thereto disposed relatively inward, and means for rotating said rotative means in one direction to move said shaft means toward said relatively outward position and in the opposite direction to move said shaft means toward said relatively inward position.

4. The combination of claim 3, said rotative means comprising a disc having the inner ends of said toggle means pivotally connected around its periphery.

5. The combination of claim 4, said shaft means being cylindrical, said internal pipe clamp means including the same plurality as said plurality of shaft means of circularly spaced elements each having a cylindrical bore in which one of said shaft means is longitudinally slidably disposed, each said shaft means being adapted at its outer end for non-damaging contact with the interior side of the wall of said pipe.

6. The combination of claim 3, each said shaft means being disposed radially of said pipe, each said toggle means being disposed radially of said pipe when in said first position and being disposed angularly of radially when in said second position.

7. The combination of claim 3, said means for rotating said rotative means comprising hydraulic drive means.

8. The combination of claim 3, said means for rotating said rotative means comprising pneumatic drive means.

9. The combination of claim 3, said means for rotating said rotative means comprising shaft means connected to said rotative means and disposed along the axis of rotation of said rotative means and having gear means affixed thereto, rack means engaging said gear means, and means for longitudinally moving said rack means to rotate said shaft means and said rotative means.

10. The combination of claim 9, said gear means comprising pinion gear means and said rack means having gear teeth therealong engaged therewith, said rack means being moved by fluid pressure acting against piston means slidably and sealingly disposed in cylinder means.

11. The combination of claim 1, said first and second body means comprising mutually slidably telescoped cylindrical tubular bodies, means engaged between said first and second body means preventing rotation each with respect to the other, means for slidingly moving said second body means in both directions along said first body means.

12. The combination of claim 11, said support means comprising circular body means concentrically rotatably slidingly disposed around said second body means.

13. The combination of claim 12, said means for supporting said first body means adjacent an end of a cylindrical pipe comprising internal pipe clamp means adapted to forcefully engage the interior of said pipe.

14. The combination of claim 13, said means for rotating said support means around said second body means comprising first ring gear means supported concentrically around said support means, and drive means supported by said second body means having a drive shaft having gear means engaged with said first ring gear means.

15. The combination of claim 14, said cutting tool means comprising at least one cutting tool, each cutting tool being supported on a slide member mounted slidably on generally radially disposed slide means carried by said support means, a said cylinder means being connected between each said slide member and said support means for moving said cutting tool outwardly to engage the pipe end when said support means is rotated around said second body means and for moving said cutting tool inwardly to be disengaged from the pipe end when said support means is not rotated around said second body means.

16. The combination of claim 15, said means for supplying fluid to said cylinder means including fluid pump means supported by said support means, second ring gear means fixed concentrically around said second body means, said pump means having drive shaft means having gear means therearound, loop means engaged around said pump means gear means and said second ring gear means whereby said pump means is operated by rotation of said support means around said second body means, and including fluid conduit means connected to convey fluid from said pump means to energize said cylinder means.

17. The combination of claim 16, including follower wheel means carried by each said slide member disposed inwardly of said cutting tool carried thereby, said follower wheel means engaging the interior side of the wall of said pipe to position said cutting tool radially with respect to the pipe end when said cutting tools are moved to engage the pipe end.

18. The combination of claim 17, said cylinder means each comprising at least one hydraulic cylinder, and said fluid pump means comprising a hydraulic pump.

19. The combination of claim 18, each said slide means comprising a pair of spaced parallel cylindrical shafts each fixed at each end to a base plate fixed to said support means, each said slide member comprising plate means having a pair of cylindrical bores therethrough slidably disposed around said shafts, a said hydraulic cylinder being fixed to said plate means at one of its ends and to said base plate at its other end parallel to said shafts at opposite sides of each said plate means.

20. The combination of claim 18, each said slide means comprising a pair of spaced parallel cylindrical shafts each fixed at each end to said support means, each said slide member having a pair of cylindrical bores therethrough slidably receiving said shafts, a said hydraulic cylinder being fixed between said support means and said slide member parallel to said shafts at opposite sides of each said slide member.

21. The combination of claim 18, said drive means supported by said second body means comprising hydraulic motor means.

22. The combination of claim 21, said first and second body means comprising mutually slidably telescoped cylindrical tubular bodies, means engaged between said first and second body means preventing rotation each with respect to the other, means for slidingly moving said second body means in both directions along said first body means.

23. The combination of claim 22, said means for slidingly moving said second body means in both directions along said first body means comprising hydraulically operated screw jack means connected between said first and second body means.

24. The combination of claim 23, including hydraulic control means comprising first hydraulic control means for controlling said hydraulically operated screw jack means, second hydraulic control means for controlling said hydraulic motor means supported by said second body means, and third hydraulic control means for controlling said cylinder means, said first and second hydraulic control means stopping operation of said hydraulically operated screw jack and said hydraulic motor means supported by said second body means when said third hydraulic control means is not supplying hydraulic fluid to said cylinder means to set said internal pipe clamp means within a pipe.

25. The combination of claim 1, said cutting tool means comprising at least one cutting tool, each cutting tool being supported on a slide member mounted slidably on generally radially disposed slide means carried by said support means, a said cylinder means being connected between each said slide member and said support means for moving said cutting tool outwardly to engage the pipe end when said support means is rotated around said second body means and for moving said cutting tool inwardly to be disengaged from the pipe end when said support means is not rotated around said second body means.

26. The combination of claim 25, including follower wheel means carried by each said slide member disposed inwardly of said cutting tool carried thereby, said follower wheel means engaging the interior side of the wall of said pipe to position said cutting tool radially with respect to the pipe end when said cutting tools are moved to engage the pipe end.

27. The combination of claim 26, said cylinder means each comprising at least one hydraulic cylinder, and said means for supplying fluid to said cylinder means comprising a hydraulic pump.

28. The combination of claim 27, each said slide means comprising a pair of spaced parallel cylindrical shafts each fixed at each end to a base plate fixed to said support means, each said slide member comprising plate means having a pair of cylindrical bores therethrough slidably disposed around said shafts, said hydraulic cylinder being fixed to said plate means at one of its ends and to said base plate at its other end parallel to said shafts at opposite sides of each said plate means.

29. The combination of claim 27, each said slide means comprising a pair of spaced parallel cylindrical shafts each fixed at each end to said support means, each said slide member having a pair of cylindrical bores therethrough slidably receiving said shafts, a said hydraulic cylinder being fixed between said support means and said slide member parallel to said shafts at opposite sides of each said slide member.

30. The combination of claim 27, said means for supporting said first body means comprising means carried by said first body means adapted to engage the interior of said pipe.

31. The combination of claim 30, said means adapted to engage the interior of said pipe comprising internal pipe clamp means comprising a plurality of circularly spaced longitudinally movable shaft means, rotative means supported concentrically inward of said shaft means, plural toggle means each pivotally connected at its outer end to one of said shaft means and each pivotally connected at its inner end to said rotative means, said toggle means each being movable by rotation of said rotative means between a first position with the shaft means connected thereto disposed relatively outward and a second position angular to said first position with the shaft means connected thereto disposed relatively inward, and means for rotating said rotative means in one direction to move said shaft means toward said relatively outward position and in the opposite direction to move said shaft means toward said relatively inward position.

32. The combination of claim 31, said rotative means comprising a disc having the inner ends of said toggle means pivotally connected around its periphery.

33. The combination of claim 32, said shaft means being cylindrical, said internal pipe clamp means including the same plurality as said plurality of shaft means of circularly spaced elements each having a cylindrical bore in which one of said shaft means is longitudinally slidably disposed, each said shaft means being adapted at its outer end for non-damaging contact with the interior side of the wall of said pipe.

34. The combination of claim 33, each said shaft means being disposed radially of said pipe, each said toggle means being disposed radially of said pipe when in said first position and being disposed angularly of radially when in said second position.

35. The combination of claim 34, said means for rotating said rotative means comprising shaft means connected to said rotative means and disposed along the axis of rotation of said rotative means and having gear means affixed thereto, rack means engaging said gear means, and means for longitudinally moving said rack means to rotate said shaft means and said rotative means.

36. The combination of claim 35, said gear means comprising pinion gear means and said rack means having gear teeth therealong engaged therewith, said rack means being moved by fluid pressure acting against piston means slidably and sealingly disposed in cylinder means.

37. The combination of claim 36, said first and second body means comprising mutually slidably telescoped cylindrical tubular bodies, means engaged between said first and second body means preventing rotation each with respect to the other, means for slidingly moving said second body means in both directions along said first body means.

38. The combination of claim 37, said means for slidingly moving said second body means in both directions along said first body means comprising screw jack means connected between said first and second body means.

* * * * *